United States Patent
Brown et al.

(10) Patent No.: US 9,758,672 B2
(45) Date of Patent: Sep. 12, 2017

(54) FLAME-RETARDANT POLYOLEFIN/THERMOPLASTIC POLYURETHANE COMPOSITION

(75) Inventors: Geoffrey D. Brown, Bridgewater, NJ (US); Robert F. Eaton, Belle Mead, NJ (US)

(73) Assignee: Union Carbide Chemicals & Plastics Technology LLC, Midland, MI (US)

( * ) Notice: Subject to any disclaimer, the term of this patent is extended or adjusted under 35 U.S.C. 154(b) by 721 days.

(21) Appl. No.: 12/865,055

(22) PCT Filed: Feb. 5, 2009

(86) PCT No.: PCT/US2009/033236
§ 371 (c)(1), (2), (4) Date: Jul. 28, 2010

(87) PCT Pub. No.: WO2009/100232
PCT Pub. Date: Aug. 13, 2009

(65) Prior Publication Data
US 2011/0011616 A1   Jan. 20, 2011

Related U.S. Application Data

(60) Provisional application No. 61/027,221, filed on Feb. 8, 2008.

(51) Int. Cl.
| | |
|---|---|
| *H01B 7/295* | (2006.01) |
| *C08L 75/04* | (2006.01) |
| *C08L 23/08* | (2006.01) |
| *C08L 75/06* | (2006.01) |
| *C08L 75/08* | (2006.01) |
| *C08L 85/02* | (2006.01) |
| *H01B 3/30* | (2006.01) |
| *H01B 3/44* | (2006.01) |

(52) U.S. Cl.
CPC ........... *C08L 75/04* (2013.01); *C08L 23/0853* (2013.01); *C08L 75/06* (2013.01); *C08L 75/08* (2013.01); *C08L 85/02* (2013.01); *H01B 3/302* (2013.01); *H01B 3/441* (2013.01); *H01B 7/295* (2013.01); *C08L 2201/02* (2013.01)

(58) Field of Classification Search
CPC ........................................... H01B 7/295
USPC ................... 174/110 R, 110 P, 113 R, 121 A
See application file for complete search history.

(56) References Cited

U.S. PATENT DOCUMENTS

| | | | |
|---|---|---|---|
| 4,242,468 A | 12/1980 | Baack et al. | |
| 4,383,050 A | 5/1983 | Nissen et al. | |
| 4,423,185 A | 12/1983 | Matsumoto et al. | |
| 4,752,626 A | 6/1988 | Hoye et al. | |
| 5,149,739 A | 9/1992 | Lee | |
| 5,486,570 A | 1/1996 | St. Clair | |
| 5,668,217 A | 9/1997 | Clark | |
| 5,852,118 A | 12/1998 | Horrion et al. | |
| 6,248,821 B1 | 6/2001 | Nozaki et al. | |
| 6,319,985 B1 | 11/2001 | Bruning et al. | |
| 6,759,487 B2 | 7/2004 | Gornowicz et al. | |
| 6,861,452 B2 | 3/2005 | Tokuyasu et al. | |
| 8,129,619 B2 * | 3/2012 | Moriuchi et al. | ......... 174/110 R |
| 2003/0031818 A1 | 2/2003 | Horacek | |
| 2007/0023735 A1 * | 2/2007 | Biscoglio et al. | ............ 252/388 |

FOREIGN PATENT DOCUMENTS

| | | | |
|---|---|---|---|
| EP | 197260 A1 | 10/1986 | |
| EP | 347794 A1 | 12/1989 | |
| EP | 353673 A1 | 2/1990 | |
| EP | 420246 A1 | 4/1991 | |
| EP | 732349 A2 | 9/1996 | |
| EP | 837097 A1 | 4/1998 | |
| EP | 1719800 | * | 8/2006 |
| GB | 1440030 A | 6/1976 | |
| JP | 2001261855 A | 9/2001 | |
| WO | WO-9302113 A1 | 2/1993 | |
| WO | WO-9919406 A1 | 4/1999 | |
| WO | WO-00/63293 A1 | 10/2000 | |
| WO | WO-0063293 A1 | 10/2000 | |
| WO | WO 2007/058349 | * | 5/2007 |

OTHER PUBLICATIONS

Anonymous: "MyCatalog 2007" K2007: 17th International Trade Fair Plastics and Rubber [Online] 2007, pp. 1946-1947, XP002527143.

* cited by examiner

*Primary Examiner* — Chau N Nguyen

(57) ABSTRACT

The present invention is a flame-retardant polyolefin/thermoplastic polyurethane formulation made from or containing a polyolefin, a thermoplastic polyurethane, and an intumescent, polyphosphate flame retardant composition. The invented system achieves elongations >400% and tensile strengths >1500 psi while the same polyolefin only achieved 100% elongation and <1000 psi tensile strength. Also, the present invention shows improved tape extrusion performance versus a comparable TPU only composition, indicating improved melt rheology/fabrication capability for extrusion applications.

7 Claims, No Drawings

FLAME-RETARDANT POLYOLEFIN/THERMOPLASTIC POLYURETHANE COMPOSITION

This invention relates to flame retardant formulations for wire and cable applications. Specifically, it relates to halogen-free, flame retardant polyolefin/thermoplastic polyurethane formulations for jacketing for wires, jacketing for cables, extruded sheeting, and extruded profiles.

Metal hydrate-based polyolefin compounds and intumescent-based polyolefin compounds do not achieve simultaneously industry-required flame and mechanical properties. Notably, the addition of flame retardant fillers at loadings of 40-50 weight percent to achieve good burn test performance will cause the resulting polyolefin compound to have poor mechanical properties. As such, it is desirable to provide a polyolefin composition with excellent mechanical properties, such as high elongation, high flexibility (low modulus), good tensile strength, and improved deformation temperature as well as excellent burn performance.

To that end, the presently invented composition is provided, comprising a polyolefin, a thermoplastic polyurethane, and an intumescent, polyphosphate flame retardant. Specifically, the present invention achieves elongations >400% and tensile strengths >1500 psi while the same polyolefin only achieved 100% elongation and <1000 psi tensile strength. Also, the present invention shows improved tape extrusion performance versus a comparable TPU only composition, indicating improved melt rheology/fabrication capability for extrusion applications. The present invention is particularly useful in the preparation of wire-and-cable jackets and other extruded articles, such as sheeting and profiles.

The composition of the present invention comprises a polyolefin, a thermoplastic polyurethane, and an intumescent, polyphosphate flame retardant composition. Preferably, the presently described composition is halogen-free.

The polyolefin may be polar, nonpolar, or a mixture thereof. The polyolefin is present in an amount of about 5 to about 90 weight percent.

Suitable polar polyolefins include (i) copolymers of ethylene and an unsaturated ester, (ii) copolymers of ethylene and an unsaturated acid such as acrylic or methacrylic acid, (iii) copolymers of ethylene and a vinyl silane (e.g., vinyltrimethoxysilane and vinyltriethoxysilane), and (iv) interpolymers of any of these comonomers. Preferably, the polyolefin is a polar, copolymer of ethylene and an unsaturated ester.

The portion of the copolymer attributed to the ester comonomer can be in the range of about 5 to about 50 percent by weight based on the weight of the copolymer, and is preferably in the range of about 15 to about 40 percent by weight. The melt index of the ethylene/unsaturated ester copolymers can be in the range of about 0.5 to about 50 grams per 10 minutes.

When the unsaturated ester is an alkyl acrylate or an alkyl methacrylate, the alkyl groups can have 1 to 8 carbon atoms and preferably have 1 to 4 carbon atoms. Examples of the acrylates and methacrylates are ethyl acrylate, methyl acrylate, methyl methacrylate, t-butyl acrylate, n-butyl acrylate, n-butyl methacrylate, and 2-ethylhexyl acrylate.

When the unsaturated ester is a vinyl carboxylate, the carboxylate group can have 2 to 8 carbon atoms and preferably have 2 to 5 carbon atoms. Examples of the vinyl carboxylates are vinyl acetate, vinyl propionate, and vinyl butanoate.

Suitable nonpolar polyolefins include (i) homopolymers of ethylene, (ii) copolymers of ethylene and one or more alpha-olefins, and, optionally, a diene, (iii) ethylene copolymers with carbon monoxide, propylene, and butene, (iv) homopolymers of propylene, (v) copolymers of propylene and other olefins, and (vi) terpolymers of propylene, ethylene, and dienes.

Thermoplastic polyurethane polymers are known in the art and are typically obtained by the reaction of a linear hydroxyl-terminated polyol, an organic diisocyanate, and a chain extender. Thermoplastic polyurethanes (TPUs) useful in the present invention include polyester TPUs and polyether TPUs.

Notably, the polyesters TPUs can be made with di-acids like adipic acid and diols like ethylene glycol, propane diol, and butane diol while the polyether TPUs can be made with polyols of polyethylene oxide, propylene oxide, and butylene oxide. The TPU is present in an amount of about 0.1 to 95 weight percent.

The intumescent, polyphosphate flame retardant composition is a blend of (i) an intumescent, nitrogen-containing polyphosphate and (ii) a melamine or a melamine-derivative co-additive. Preferably, the intumescent, nitrogen-containing polyphosphate is an ammonium polyphosphate, a piperazine polyphosphate, or derivatives thereof. More preferably, the intumescent, nitrogen-containing polyphosphate is piperazine polyphosphate. As an intumescent flame retardant, the nitrogen-containing polyphosphate has the character of swelling and charring when exposed to flame. The intumescent, polyphosphate flame retardant composition is present in an amount of about 0.1 to about 70 weight percent.

The composition of the present invention may further comprise other non-halogen flame retardants, such as metal oxides, metal oxide hydrates, metal carbonates, a carbonate plus an acid or acid-generating material, cement, urea, and polyalcohols.

The composition may further comprise other polymers such as non-olefin polymers, polyvinyl chloride, ester-ether block copolymers, ester/amide block copolymers, olefin block copolymers, and engineering plastics such as polycarbonates, polysulfones, and polyimides. The composition may also further comprise other additives such as minerals and peroxides.

In another embodiment, the present invention is a cable comprising one or more electrical conductors or a core of one or more electrical conductors, each conductor or core being surrounded by a flame retardant layer comprising the flame-retardant polyolefin/thermoplastic polyurethane composition described herein.

In yet another embodiment, the present invention is an extruded article comprising the flame-retardant polyolefin/thermoplastic polyurethane composition described herein.

EXAMPLES

The following non-limiting examples illustrate the invention.

Testing (1) Yield Strength (psi);
(2) Tensile Strength @ Peak (psi);
(3) Tensile Strength @ Break (psi);
(4) Elongation @ Break (%);
(5) 1% Secant Modulus (psi);
(6) 2% Secant Modulus (psi);

(7) 5% Secant Modulus (psi); and
(8) Burn property of Not Burn Flag;
(9) Time to Flag (sec);
(10) Burn property of Total Time (sec);
(11) Not Fully Burned;
(12) Uncharred (mm below flag);
(13) No Flaming Drip;
(14) High Melt Flow, wherein 1 no flow (best), 5 high flow; and
(15) Overall Rating**; Best(1)>>Worst(5), wherein #1 No Flaming Drip; #2 Char Length; #3a No melt flow; #3b not burn to flag; #3c time to flag.

Burn Test

The burn tests were performed by a vertical strip test for a 45-sec perpendicular UL94 ignition @ bottom. The test specimens were prepared to be a 100-mil strip of 75-mil plaque with embedded wire and 8" long.

Exemplified Compositions

The test specimens were prepared using the following components:
(1) PELLETHANE™ 2102-75A caprolactone polyester thermoplastic polyurethane, having a Shore A Hardness of 77A, a specific gravity of 1.17, and available from The Dow Chemical Company;
(2) PELLETHANE™ 2103-80AE polyether thermoplastic polyurethane, having a Shore A Hardness of 82A, a specific gravity of 1.13, and available from The Dow Chemical Company;
(3) ELVAX™ 40L-03 ethylene/vinyl acetate copolymer having a vinyl acetate content of 40 percent and a melt index of 3 dg/m measured at 190 degrees Celsius and 2.16 kg, available from E. I. du Pont de Nemours and Company; and
(4) FP-2100™ intumescent, nitrogen-containing polyphosphate-based flame retardant, which is a blend of piperazine polyphosphate and a phosphoric acid compound and available Amfine Chemical Corporation or Adeka Corporation.

Table 1 shows two comparative examples (Comp. Ex. 1 and 2) and three examples of the present invention (Example 3-5). Each amount is shown in weight percent.

Desired mechanical properties include a tensile strength >1500 psi and elongation >200 percent. For flame retardancy performance, an overall flame rating of 2 or less is acceptable.

TABLE 1

| Components | Comp. Ex. 1 | Comp. Ex. 2 | Ex. 3 | Ex. 4 | Ex. 5 |
|---|---|---|---|---|---|
| PELLETHANE ™ 2102-75A | 60.00 | | 45.00 | 30.00 | 15.00 |
| PELLETHANE ™ 2103-80AE | | 60.00 | | | |
| ELVAX ™ 40L-03 | | | 15.00 | 30.00 | 45.00 |
| FP-2100 ™ flame retardant | 40.00 | 40.00 | 40.00 | 40.00 | 40.00 |
| volume filler (cc/gram) | 0.24 | 0.24 | 0.24 | 0.24 | 0.24 |
| volume intumescent (cc/g) | 0.24 | 0.24 | 0.24 | 0.24 | 0.24 |
| volume resin (cc/gram) | 0.51 | 0.51 | 0.54 | 0.56 | 0.59 |
| Volume Fraction Resin | 0.684 | 0.684 | 0.695 | 0.706 | 0.716 |
| Calculated specific gravity | 1.34 | 1.34 | 1.30 | 1.25 | 1.21 |
| resin to polyphosphate additive ratio | 1.50 | 1.50 | 1.50 | 1.50 | 1.50 |

TABLE 1-continued

| Components | Comp. Ex. 1 | Comp. Ex. 2 | Ex. 3 | Ex. 4 | Ex. 5 |
|---|---|---|---|---|---|
| Physical Properties | | | | | |
| Yield Strength (psi) | 666 | 974 | 1073 | 370 | 280 |
| Tensile Strength @ Peak (psi) | 3807 | 1518 | 2959 | 1168 | 456 |
| Tensile Strength @ Break (psi) | 3807 | 1518 | 2959 | 1168 | 456 |
| Elongation @ Break (%) | 515 | 485 | 513 | 518 | 883 |
| 1% Secant Modulus (psi) | 6228 | 14204 | 3697 | 2321 | 3159 |
| 2% Secant Modulus (psi) | 6093 | 13119 | 3875 | 2459 | 2236 |
| 5% Secant Modulus (psi) | 5350 | 10921 | 3583 | 2478 | 1798 |
| Burn Results | | | | | |
| Not Burn Flag | 2/3 | 2/3 | 2/3 | 2/3 | 3/3 |
| Time to Flag (sec) | 10 | 0 | 1 | 8 | NA |
| Total Time (sec) | 11 | 7.667 | 7 | 29 | 1 |
| Not Fully Burned | 2/3 | 2/3 | 2/3 | 2/3 | 3/3 |
| Uncharred (mm below flag) | 45 | 50 | 30 | 38 | 57 |
| No Flaming Drip | 2/3 | 0/3 | 3/3 | 3/3 | 3/3 |
| High Melt Flow | 3.5 | 5 | 2 | 1.5 | 3 |
| Overall Rating | 3 | 4 | 2 | 2 | 2 |

What is claimed is:

1. A flame-retardant polyolefin/thermoplastic polyurethane composition comprising:
   (a) 15 to 45 weight percent of a polyolefin that is an ethylene/unsaturated ester copolymer that has an ester comonomer content within a range of from 15 to 40 percent by weight of the copolymer and a melt index within a range of from 0.5 grams per 10 minutes to 50 grams per 10 minutes;
   (b) 15 to 45 weight percent of a thermoplastic polyurethane; and
   (c) an intumescent, polyphosphate flame retardant composition that comprises:
      (i) an intumescent, nitrogen-containing polyphosphate and
      (ii) a melamine or a melamine-derivative co-additive,
   wherein the flame-retardant polyolefin/thermoplastic polyurethane composition exhibits an elongation at break of at least 513 percent.

2. The flame-retardant polyolefin/thermoplastic polyurethane composition of claim 1 wherein the composition is halogen-free.

3. The flame-retardant polyolefin/thermoplastic polyurethane composition of claim 1 or claim 2 wherein the intumescent polyphosphate flame retardant composition is present in an amount of from 0.1 weight percent to 70 weight percent.

4. The flame-retardant polyolefin/thermoplastic polyurethane composition of claim 1 wherein the intumescent, nitrogen-containing polyphosphate is selected from the group consisting of ammonium polyphosphate and piperazine polyphosphate.

5. The flame-retardant polyolefin/thermoplastic polyurethane composition of claim 4 wherein the intumescent, nitrogen-containing polyphosphate is piperazine polyphosphate.

6. A cable comprising one or more electrical conductors or a core of one or more electrical conductors, each conductor or core being surrounded by a flame retardant layer comprising the flame-retardant polyolefin/thermoplastic polyurethane composition according to either of claim 1 or 2.

7. An extruded article comprising the flame-retardant polyolefin/thermoplastic polyurethane composition according to either of claim 1 or 2.

* * * * *